(12) United States Patent
Bieltz et al.

(10) Patent No.: US 8,996,270 B2
(45) Date of Patent: Mar. 31, 2015

(54) METHOD FOR OPERATING A PARKING BRAKE IN A VEHICLE

(75) Inventors: Karsten Bieltz, Mudelsheim (DE); Simon Hauber, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/001,379

(22) PCT Filed: Dec. 29, 2011

(86) PCT No.: PCT/EP2011/074246
§ 371 (c)(1),
(2), (4) Date: Nov. 8, 2013

(87) PCT Pub. No.: WO2012/113485
PCT Pub. Date: Aug. 30, 2012

(65) Prior Publication Data
US 2014/0058642 A1    Feb. 27, 2014

(30) Foreign Application Priority Data
Feb. 25, 2011   (DE) .......................... 10 2011 004 763

(51) Int. Cl.
*G06F 19/00* (2011.01)
*B60T 7/12* (2006.01)
*B60T 13/74* (2006.01)
*B60T 17/22* (2006.01)

(52) U.S. Cl.
CPC ................. *B60T 7/12* (2013.01); *B60T 13/746* (2013.01); *B60T 17/221* (2013.01)
USPC .............. 701/70; 188/68; 188/72.6; 188/156; 188/163

(58) Field of Classification Search
CPC ..... B60T 13/588; B60T 13/741; B60T 7/042; B60T 7/045; B60T 7/107
USPC ........... 701/70; 188/68, 72.6, 156, 163, 106 F
See application file for complete search history.

(56) References Cited

U.S. PATENT DOCUMENTS

| | | | |
|---|---|---|---|
| 6,311,808 B1 * | 11/2001 | Halasy-Wimmer et al. . | 188/72.6 |
| 6,550,598 B2 * | 4/2003 | Drennen .................... | 192/219.4 |
| 7,188,710 B2 * | 3/2007 | Reuter et al. ................ | 188/72.7 |
| 7,227,324 B2 | 6/2007 | Erben et al. | |
| 7,264,093 B2 * | 9/2007 | Hashida et al. .............. | 188/72.8 |
| 7,604,302 B1 * | 10/2009 | Lee et al. ........................... | 303/3 |
| 7,651,175 B2 * | 1/2010 | Inagaki et al. .................. | 303/89 |
| 7,654,619 B2 * | 2/2010 | Knechtges et al. ............. | 303/11 |

(Continued)

FOREIGN PATENT DOCUMENTS

| | | |
|---|---|---|
| DE | 100 21 601 | 11/2001 |
| DE | 103 61 042 | 5/2005 |

OTHER PUBLICATIONS

International Search Report, PCT International Application No. PCT/EP2011/074246, dated May 30, 2012.

*Primary Examiner* — Mcdieunel Marc
(74) *Attorney, Agent, or Firm* — Kenyon & Kenyon LLP

(57) ABSTRACT

A method for operating a parking brake having an electromechanical braking device, which includes an electric brake motor, the electromechanical braking device being re-applied in order to generate a clamping force again in the case of a fault of the release process of the electromotive braking device.

17 Claims, 4 Drawing Sheets

(56) References Cited

U.S. PATENT DOCUMENTS

| | | | |
|---|---|---|---|
| 7,673,950 B2* | 3/2010 | Fulks et al. | 303/193 |
| 7,744,166 B2* | 6/2010 | Leiter et al. | 303/20 |
| 7,866,763 B2* | 1/2011 | Inagaki | 303/89 |
| 2005/0109568 A1* | 5/2005 | Ether | 188/156 |
| 2006/0091728 A1* | 5/2006 | Fulks et al. | 303/193 |
| 2013/0338895 A1* | 12/2013 | Bieltz et al. | 701/70 |

* cited by examiner

METHOD FOR OPERATING A PARKING BRAKE IN A VEHICLE

FIELD

The present invention relates to a method for operating a parking brake in a vehicle.

BACKGROUND INFORMATION

A parking brake in a vehicle is described in German Patent Application No. DE 103 61 042 B3, which is used for generating a clamping force which holds the vehicle at a standstill. The parking brake is electromechanically designed and includes an electric brake motor as an actuator which, when activated, displaces a brake piston, which is the carrier of a brake lining, axially against a brake disk.

To release the parking brake, the electric brake motor must be activated in the opposite direction. The vehicle may be moved again as soon as the clamping force of the parking brake has been at least largely reduced.

SUMMARY

An object of the present invention is to ensure a high degree of safety in dangerous situations in the event of a fault in the parking brake.

An example method according to the present invention relates to an electromechanical parking brake in a vehicle having an electric brake motor which, when activated, generates a clamping force which holds the vehicle in place. The clamping force is generated in particular in such a way that a rotational movement of the brake motor is transferred into an axial actuating motion of a brake piston having a brake lining which is pressed against a brake disk.

To end the parking operation, the parking brake is released again. To that end, the electric brake motor is activated in the opposite direction so that the brake piston including the brake lining is moved away from the brake disk and the clamping force is reduced. If an error occurs during the release process, which leads to a fault in the clamping force reduction, the risk basically exists that, despite the incomplete reduction of clamping force, the driver attempts to set the vehicle in motion. Another risk is seen in the fact that after the fault, the remaining clamping force is no longer sufficient for securely holding the vehicle in place, so that on an inclined roadway in particular, the risk exists that the vehicle inadvertently starts to move.

To minimize the potential risk of danger in the case of such faults, and to restore the parking brake to a state of normal functioning, according to the present invention, in the case of a fault of the release process, the electromotive braking device is re-applied in order to regenerate a clamping force. This ensures that the vehicle is held in place with sufficient clamping force and cannot inadvertently roll away. The brake is reapplied to regenerate a clamping force automatically as soon as a fault of the previous release process is detected.

A low voltage or a voltage drop in the vehicle electrical system which is large enough to interrupt the release process of the electromechanical parking brake is considered, for example, as a fault. However, a fault may also be present if the driver shows an incorrect behavior, for example, attempting to set the vehicle in motion before the release process has completed and thereby choking off the engine.

With the aid of the example method according to the present invention, the vehicle is again brought to a safe stopped condition after such faults. Application is continued in particular until a nominal clamping force is achieved, after which the electric brake motor may be switched off, so that the parking brake is again in its fixed starting condition. To release the parking brake again, a manual activation must be performed in this case by the driver.

When the parking brake is brought into the parking state in which the parking brake applies a nominal clamping force, a recalibration of the parking brake is achieved. The electric brake motor is in a defined position, from which the parking brake may be released again.

It may be advantageous to initially open the electric brake motor further until freewheeling operation is achieved, before a clamping force is generated again, i.e., the application of the parking brake after the occurrence of a fault. This has the advantage that when the electric brake motor is subsequently applied when started from the freewheeling condition, it has sufficient momentum for achieving the nominal clamping force.

Insofar as the parking brake includes two electromechanical braking devices, each having an electric brake motor, for example, on both wheels on the front axle or the rear axle, it may be advantageous, to initially displace both brake motors into the direction of opening before the re-application of the brake until freewheeling operation is achieved and only subsequently carry out the clamping operation.

Furthermore, to prevent the vehicle from rolling away inadvertently, it may be advantageous to generate a clamping force via an auxiliary braking device when a fault occurs during the release process and the associated shut-off of the electric brake motor. The auxiliary braking device is in particular the hydraulic vehicle brake, the hydraulic pressure of which acts on the brake piston and generates a hydraulic clamping force. Also during the normal application operation, it may be advantageous to activate the auxiliary braking device, for example, in addition to the electromechanical braking device, in order to achieve a desired clamping force level.

Alternatively or additionally to activating the auxiliary braking device in the case of a fault, it is also possible, if two electromechanical braking devices are separately present, each having one electric brake motor to initially leave one of the brake motors in the instantaneous position assumed by this brake motor during the occurrence of the fault, so that the clamping force generated via this brake motor is still effective. At the same time, a recalibration operation may be carried out in the second brake motor, i.e., initially opened until the freewheeling condition is achieved and subsequently applied until a nominal clamping force level is reached. Thereafter, the first electric brake motor, which initially persists in its instantaneous position, may be recalibrated so that this electric brake motor is also initially opened until the freewheeling condition is achieved and subsequently closed until a nominal clamping force is achieved. After the recalibration is completed, both electric brake motors are advantageously switched off to freeze the achieved clamping force.

According to another advantageous embodiment, it is provided that, after the fault occurs in a parking brake having two electromechanical braking devices, the electric brake motor of one braking device is initially applied until a minimum clamping force is achieved, and subsequently the second electric brake motor is recalibrated in the prescribed manner, after which the first electric brake motor may also be recalibrated. The advantage of this approach is that a minimum clamping force is ensured via the upstream application of the first electric brake motor.

The example method according to the present invention may be run in a regulating and control unit in the vehicle, which may be an integral part of the parking brake.

Additional advantages and advantageous example embodiments are described below and shown in the figures.

DETAILED DESCRIPTION OF EXAMPLE EMBODIMENTS

Figure 1:
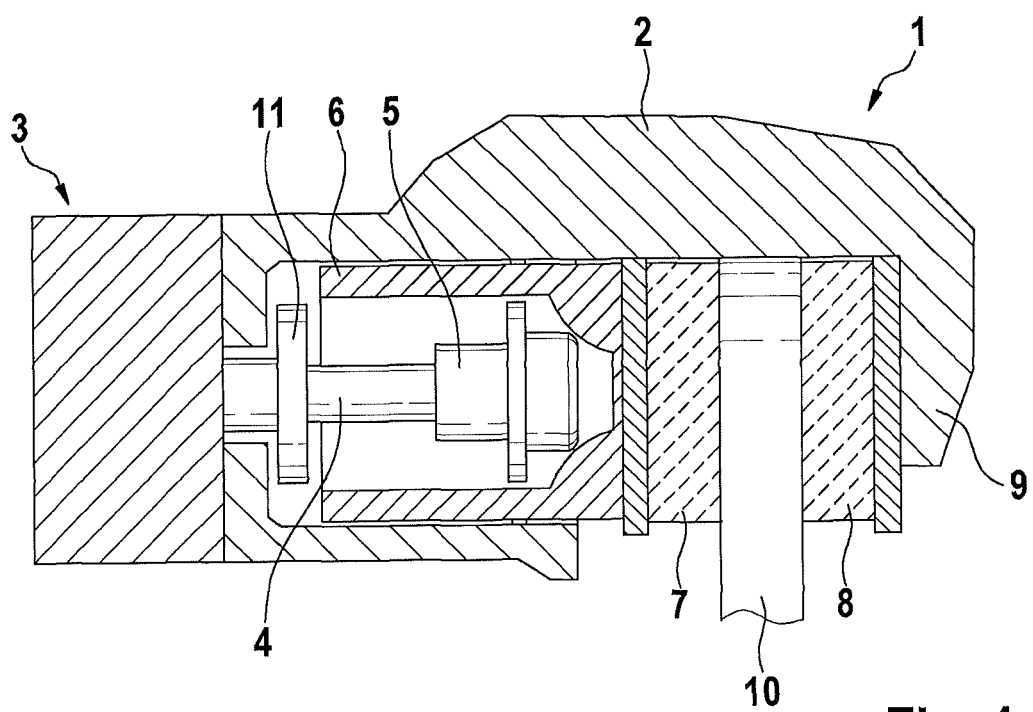
FIG. 1 shows a section through an electromechanical parking brake for a vehicle, in which the clamping force is generated via an electric brake motor.

An electromechanical parking brake 1 for holding a vehicle at a standstill is shown in FIG. 1. Parking brake 1 includes a brake caliper 2 having a caliper unit 9 which reaches over a brake disk 10. As an actuator, parking brake 1 has an electric motor as a brake motor 3 which rotatably drives a spindle 4 on which a spindle component 5 is rotatably supported. When spindle 4 is rotated, spindle component 5 is displaced axially. Spindle component 5 moves within a brake piston 6, which is the carrier of a brake lining 7, which is pressed by brake piston 6 against brake disk 10. On the diametrically opposed side of brake disk 10, another brake lining 8 which is held stationary on caliper 9 is located.

Within brake piston 6, spindle component 5 is enabled to move axially forward in the direction of brake disk 10 when spindle 4 is rotated, or to move axially rearward until reaching a stop 11 when spindle 4 is rotated in the opposite direction. For generating a clamping force, spindle component 5 acts on the inner face of brake piston 6, causing brake piston 6, which is axially displaceably supported in parking brake 1 to be pressed with its brake lining 7 against the facing surface of brake disk 10.

The parking brake may, if necessary, be supported by a hydraulic vehicle brake, so that the clamping force is composed of an electromotive component and a hydraulic component. In the case of hydraulic support, the back side of brake piston 6 facing the brake motor is acted upon by pressurized hydraulic fluid.

Figure 2:
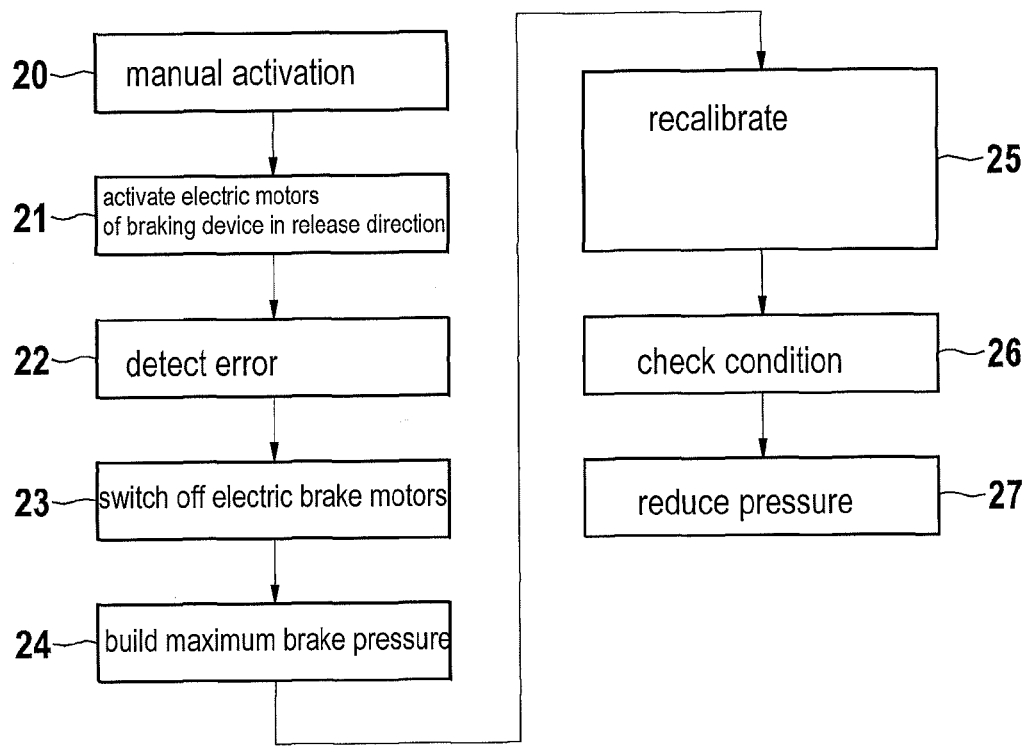
FIG. 2 shows a flow chart for recalibrating the parking brake after the occurrence of a fault during the release process.

FIG. 2 shows a flow chart including method steps which are carried out if a fault occurs during the release process of the parking brake. The release process begins according to method step 20 by a manual activation by the driver. After that, according to step 21, the electric brake motors of the two electromechanical braking devices, which collectively form the parking brake and are each mounted on a wheel of a common axle, are activated in the release direction so that the pressure of the brake piston on the brake disk is reduced and the clamping force is reduced.

In method step 22, an error is detected during the release process, which is present, for example, in the form of a voltage drop in the vehicle electrical system. An error is also present if it is attempted to move the vehicle before the release process has been completed.

According to step 23, both electric brake motors of the parking brake are switched off, even if the previously detected error affects only one brake motor or one of the two electromechanical braking devices.

In method step 24, after the electric brake motors have been switched off, a maximum brake pressure is automatically built up via the hydraulic vehicle brake, the maximum brake pressure acting upon the brake disks via the same brake pistons which are also acted upon by the electric brake motors. This is intended to ensure a sufficient clamping force for securely holding the vehicle in place.

Method step 25 represents the recalibration of the electromechanical braking device. In this step, the electric brake motors of both braking devices are first activated further in the direction of the release position until the freewheeling condition is achieved in which no more electromechanical clamping force is generated. Subsequently, both electric brake motors are closed again until a nominal clamping force is achieved. This completes the recalibration for both electromechanical braking devices. This condition is checked in method step 26, the hydraulic brake pressure, which was previously built up on all four wheels, being reduced again according to method step 27 after a successful completion of the recalibration. The holding in place is now effectuated solely via the electromechanical braking device of the parking brake. The entire process is thus completed, and the parking brake is again in the closed state, in which a nominal clamping force is applied. To release the parking brake again, a manual operation is required by the driver.

Figure 3:
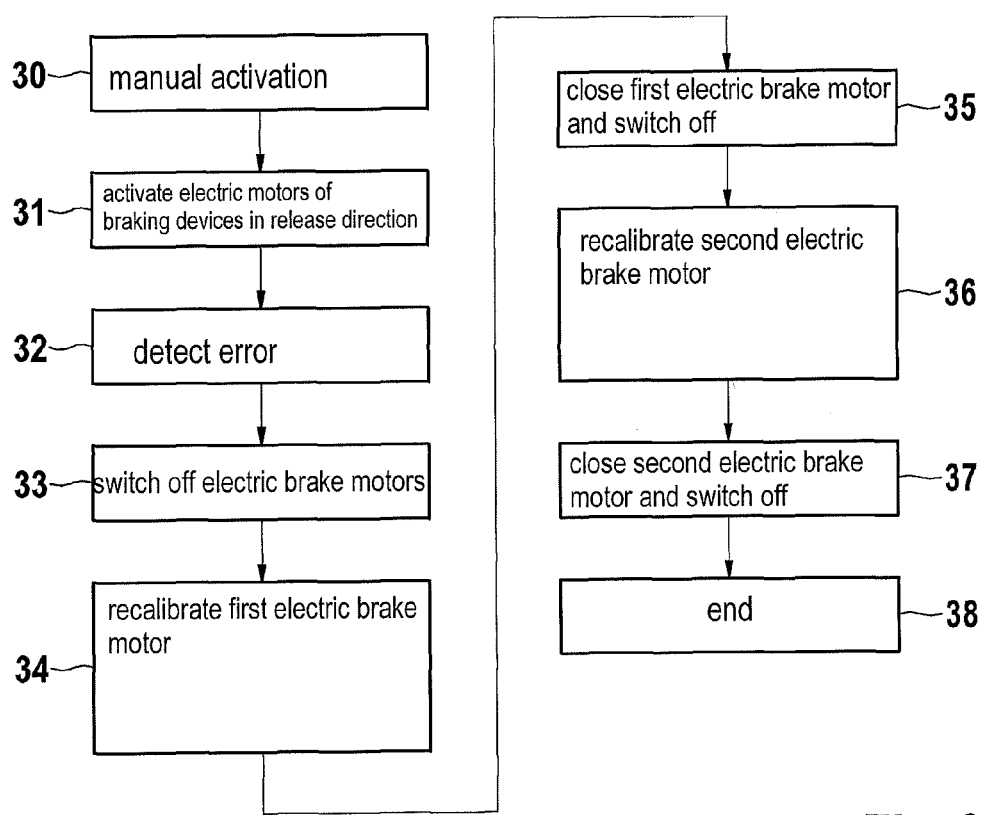
FIG. 3 shows a flow chart for recalibrating the parking brake after the occurrence of a fault during the release process in another embodiment.

FIG. 3 shows a flow chart for recalibrating the parking brake after the occurrence of a fault during the release process in one alternative embodiment. As in the preceding exemplary embodiment, the driver manually releases the parking brake in a first method step 30, after which the two electric brake motors of the parking brake are activated in the direction of their release position in subsequent method step 31 and the clamping force is reduced. In next method step 32, a fault is detected during the release process, after which both electric brake motors are switched off in method step 33.

Method steps 30 to 33 are consistent with method steps 20 to 23 of the exemplary embodiment according to FIG. 2. In contrast to the preceding exemplary embodiment, no hydraulic braking pressure is applied as shown in FIG. 3 after the electric brake motors are switched off. Instead, according to method step 34, the first electric brake motor is first recalibrated, whereas the second electric brake motor persists in the instantaneous position in which no clamping force is applied yet. This ensures that the vehicle is not inadvertently set in motion. For recalibration of the first electric brake motor, it is first activated further in the direction of the release position until the freewheeling condition is achieved in this motor. Subsequently, the first electric brake motor is closed again until a nominal clamping force is achieved and then switched off; this completes the recalibration of the first electric brake motor (step 35).

According to method step 36, the recalibration of the second electric brake motor is carried out subsequently by activating it first in the direction of the release position until freewheeling is achieved and subsequently displacing it in the direction of the closed position until a nominal clamping force is achieved, after which this second electric brake motor is also switched off (step 37).

This completes the recalibration of both electric brake motors; the parking brake is in its closed state, in which a nominal clamping force is applied. This completes the method (step 38).

Figure 4:
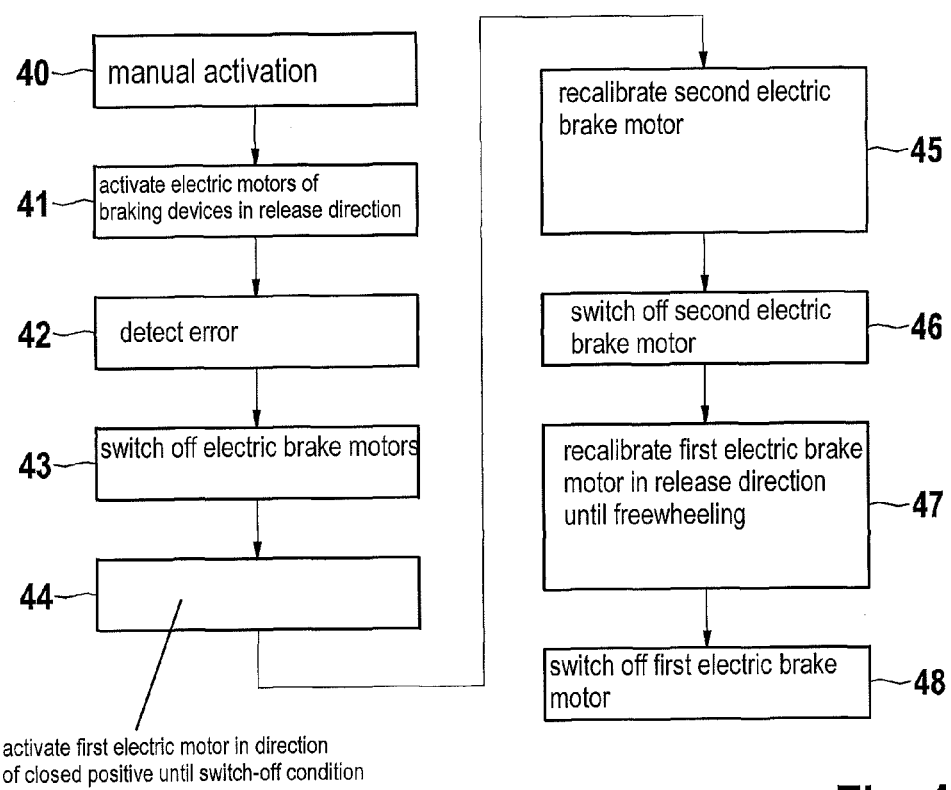
FIG. 4 shows a flow chart for recalibrating the parking brake after the occurrence of a fault during the release process in another embodiment.

The flow chart shown in FIG. 4 is substantially consistent with the one according to FIG. 3; in particular, first method steps 40 through 43 and method steps 30 through 33 of the method according to FIG. 3 are identical, so that reference is made to the description there.

In contrast to the preceding exemplary embodiment, in method step 44, a first electric brake motor is first activated in the direction of the closed position of the brake until a switching-off condition is satisfied, in particular, a defined clamping force is set via this electric brake motor. This is intended to ensure that there is an adequately high clamping force to securely hold the vehicle in place during the recalibration.

In next method step 45, the second electric brake motor is recalibrated by first activating it in the direction of the release position until the freewheeling position is achieved and subsequently displacing it into the closed position until a nominal clamping force level is achieved. After that, the second electric brake motor is switched off according to method step 46.

Following that, the first electric brake motor is recalibrated by first activating it in the direction of the release position until the freewheeling position is achieved and subsequently displacing it in the direction of the closed position until a nominal clamping force is achieved. Thereafter, according to method step 48, this electric brake motor is also switched off; the method is completed.

What is claimed is:

1. A method for operating a parking brake, the parking brake including an electromechanical braking device having an electric brake motor, the method comprising:
   re-applying, in the case of a fault of a release process of the parking brake in which a clamping force generated by the electromechanical braking device is reduced, the electromechanical braking device to generate a clamping force again.

2. The method as recited in claim 1, wherein the electric brake motor of the electromechanical braking device is switched off after a nominal clamping force is achieved.

3. The method as recited in claim 1, wherein the electric brake motor is opened before a clamping force of the electric motor is generated again until freewheeling operation of the electric brake motor is achieved.

4. The method as recited in claim 1, wherein a hydraulic vehicle brake is activated in the case of an interruption of the release process.

5. The method as recited in claim 1, wherein the parking brake includes two electromechanical braking devices, each of which has an electric brake motor.

6. The method as recited in claim 5, wherein the two electromechanical braking devices are displaced simultaneously in one of: i) a direction of a release position, or ii) a clamping position after the occurrence of a fault.

7. The method as recited in claim 5, wherein the two electromechanical braking devices are moved in a direction of a release position or a clamping position at staggered intervals after the occurrence of a fault.

8. The method as recited in claim 7, wherein an electric brake motor persists in its instantaneous position after the occurrence of a fault and the second electric brake motor is applied for recalibration.

9. The method as recited in claim 7, wherein an electric brake motor is applied after the occurrence of a fault and the second electric brake motor is recalibrated.

10. The method as recited in claim 5, further comprising:
   initially leaving a first electric brake motor of a first electromechanical braking device, the first electromechanical braking device being one of the two electromechanical braking devices, in its instantaneous position after the occurrence of a fault, and recalibrating a second brake motor of a second electromechanical braking device, the second electromechanical braking device being an other one of the two electromechanical braking devices,
   after the recalibrating of the second brake motor is completed, recalibrating the first brake motor, and
   after the recalibrating of both the first brake motor and the second brake motor is completed, switching off both the first brake motor and the second brake motor.

11. The method as recited in claim 10, wherein the first brake motor and the second brake motor are recalibrated by first opening the respective brake motor until a freewheeling operation is achieved and subsequently by closing the respective brake motor until a nominal clamping force is achieved.

12. The method as recited in claim 1, wherein the clamping force is additionally generated by an auxiliary braking device.

13. The method as recited in claim 12, wherein a hydraulic vehicle brake is used as the auxiliary braking device.

14. The method as recited in claim 1, wherein the fault is indicated if a vehicle having the parking brake experiences one of: (i) a low voltage in an electrical system of the vehicle, (ii) a voltage drop in the electrical system of the vehicle that is large enough to interrupt a release process of the electromechanical parking brake, and (iii) an incorrect driver behavior.

15. A regulating and control unit, the regulating and control unit configured to operate a parking brake having an electromechanical braking device with an electric brake motor, the regulating and control unit configured to reapply, in the case of a fault of a release process of the parking brake in which a clamping force generated by the electromechanical braking device is reduced, the electromechanical braking device to generate a clamping force again.

16. A parking brake system in a vehicle including a regulating and control unit, the regulating and control unit configured to operate a parking brake having an electromechanical braking device with an electric brake motor, the regulating and control unit configured to reapply, in the case of a fault of a release process of the parking brake in which a clamping force generated by the electromechanical braking device is reduced, the electromechanical braking device to generate a clamping force again.

17. An electromechanical parking brake in a vehicle, the electromechanical parking brake comprising:
   a brake caliper having a caliper unit that reaches over a brake disk; and
   an actuator comprising:
      an electric motor,
      a spindle rotatably driven by the electric motor,
      a spindle component rotatably supported by the spindle,
      a brake piston axially enclosing the spindle component, the brake piston being the carrier of a brake lining,
      a brake disk, the brake disk having a facing surface touching the brake lining,
   wherein, in the case of a fault of a release process of the parking brake in which a clamping force generated by the electromechanical braking device is reduced, the electric motor generating a new clamping force by driving the spindle to rotate in a forward direction thereby displacing the spindle component axially, the spindle component acting on an inner face of the brake piston, and the brake piston pressing the brake lining against a facing surface of the brake disk.

* * * * *